UNITED STATES PATENT OFFICE.

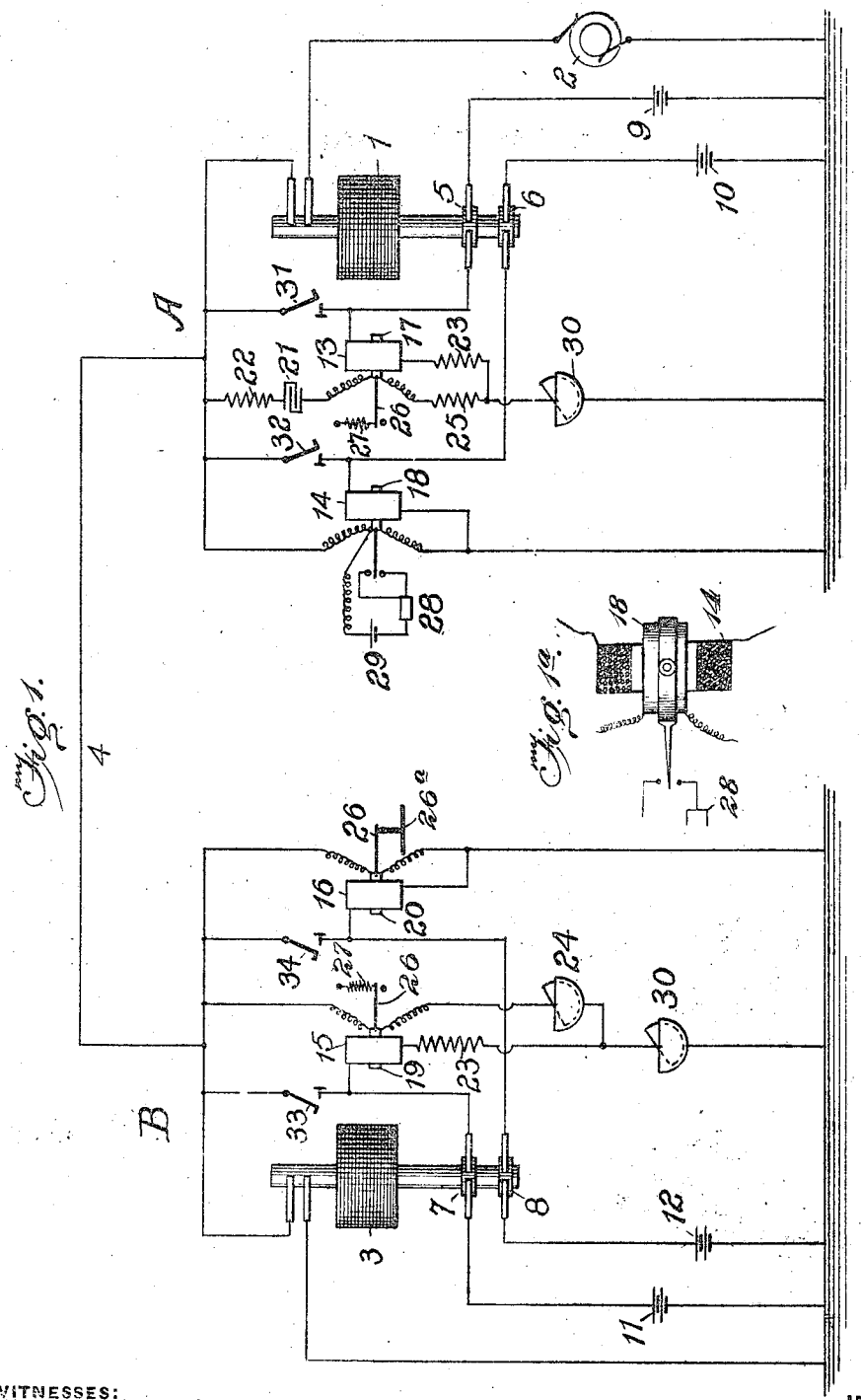

REGINALD A. FESSENDEN, OF WASHINGTON, DISTRICT OF COLUMBIA.

MULTIPLEX TELEGRAPHY.

981,406. Specification of Letters Patent. Patented Jan. 10, 1911.

Application filed January 4, 1906. Serial No. 294,584.

*To all whom it may concern:*

Be it known that I, REGINALD A. FESSENDEN, residing at Washington, District of Columbia, a citizen of the United States, have invented certain new and useful Improvements in Multiplex Telegraphy, of which the following is a specification.

The invention described herein relates to the transmission of electrical energy, as in telegraphy, by alternating or fluctuating currents, the improvement being especially applicable to multiplex telegraphy.

Among the many reasons pointed out by me, the failure to attain practical results, seems to be due principally to the fact that over long transmission lines it is not advisable to use a very high frequency, as the attenuation and distortion produced by capacity effects of the line and other causes, are very great. Since resonance is dependent upon the cumulative effect of succeeding impulses, a certain number of impulses must be received before the desired cumulative effect or resonance is produced, and this takes time. When using a frequency of two hundred and fifty per second, a strong resonant effect requiring the accumulative energy of one hundred impulses cannot be produced in a sufficiently short time as with an ordinary high speed operator the time required for making a dot is one twenty-fifth (1/25) of a second or less, so that with two hundred and fifty cycles per second, only ten impulses would be received during the time of making a dot; hence, the selectivity would be poor and much less than that required. And further, leakage, capacity effects, etc. produce such attenuation, that impulses received from a nearby station would be strong as compared with those from a distant station, and hence would overcome the resonant effect and disturb the signals.

My improved method consists generally stated in transmitting alternating or fluctuating currents of a certain frequency from a station, and in causing these currents when received at another or receiving station, to interact with alternating or fluctuating currents flowing through a local circuit and preferably generated at the receiving station. In the particular embodiment shown and described herein, the currents received pass through a coil of an electromagnetic indicating mechanism having a local magnetic field generated not by permanent or direct current electromagnets, or by the incoming current but by a current flowing in a local circuit.

The invention is hereinafter more fully described and claimed.

In the accompanying drawing, forming a part of this specification, I have shown diagrammatically two stations with circuits and apparatus included therein.

At station A, I employ an alternating current machine, 1, either driven directly by a prime mover, as a generator, or driven as shown, as a synchronous motor by a generator, 2. At station B, I employ a synchronous alternating current motor, 3, having one of its terminals connected by a line wire, 4, to a terminal of the machine, 1, at station A. The other terminals of the electric machines, 1 and 3, may be grounded or connected by a return wire, as is well known in the art. These electric machines are operated synchronously, synchronism being obtained by connecting them to the same alternating current generator, 2, as shown or otherwise as convenient. These electric machines control the current flowing in two circuits at each station. This control may be effected by operating two alternating current generators by the machines, 1 and 3, or by operating two commutators, 5, 6 and 7, 8, which are included in the circuits of batteries, 9, 10 and 11, 12. The control effected by either of these means is such that when using alternating current generators, the current in one circuit at A will have the same alternations per second as those in one circuit at B, and the alternations in the other circuits at A and B will be equal but different from the alternations of the first circuits. When using batteries or direct current generators and commutators driven by the machines, 1 and 3, the commutators are so constructed that 5 and 7 will produce the same number of breaks per second, or the frequency of one break may be a multiple of the frequency of the other. The commutator 6 will produce the same number of breaks as 8, but the number of breaks produced by 6 and 8 will be different from those produced by 5 and 7. The circuits of the generators 9, 10, 11 and 12, may be entirely metallic or be formed in part by ground as shown, and these circuits include respectively fixed coils, 13, 14, 15, 16. It will be observed that the frequencies or fluctuations of currents flowing through 13 and 15 are the same or a multiple of each other and those of current flowing through 14 and 16 are the same or a multiple of each other. Movable coils, 17, 18, 19 and 20, are mounted to move by their torque similarly to a dynamometer and arranged in operative relation to the fixed coils, 13, 14, 15, 16, and their individual circuits are connected to the line wire, 4, and to ground or a return wire either directly, as shown in the case of coils 18 and 20, or through a capacity, 21, and an inductance, 22, placed in series with each other as in the case of coil 17 shown at station A. Either the capacity or the inductance may be used alone, depending upon natural constants of the circuit; that is, if there is already sufficient capacity in the circuit, the capacity 21 need not be used.

Inductances, 23, may be placed in series with the fixed coils as shown in the case of coils 13 and 15. Also a capacity, 24 which may be variable, is placed in series with the movable coil, as shown in the case of 19; and an inductance, 25, may be placed in series also, as in the case of coil 17.

The movable coils may operate as sounders, they being provided with fingers, 26, and springs, 27, or as shown in case of coil 18 it may operate to control a local circuit including a sounder, 28, and a generator, 29. Telegraph keys are shown at 31, 32, 33 and 34.

When all the keys are open, currents of one frequency or number of fluctuations per second will flow through coils 13 and 15, and currents of a different frequency or rate of fluctuations will flow through coils 14 and 16. As the movable coils are normally arranged at right angles to the fixed coils, they will not act as secondaries of transformers, and no current will flow through them. Should any secondary action exist it may be overcome by methods well known, as a relative position can always be found where there will not be any mutual induction between the fixed and movable coils, or one where the mutual induction will be so small that there will not be any appreciable torque between the movable and fixed coils.

When key 31 at the station A is depressed, currents of a frequency or fluctuation, determined by commutator 5, or its described equivalent, will flow out into line, 4, and through the movable coil, 19, at station B, and since the current through the local fixed coil, 15, has the same frequency or fluctuation, as coil 19, determined by the commutator, 7, or its described equivalent, there will be such a torque between the coils, 15 and 19, as will cause the coil, 19, to move and produce an indication directly as by moving a telephone diaphragm 26ª, or otherwise; or it may operate by closing a local circuit. A portion of the current whose frequency or fluctuation is determined by commutator, 5, will also flow through movable coil, 20, but since the current in its companion fixed coil, 16, has a frequency or fluctuation different from that of the current in the movable coil, being determined by the commutator, 8, or its described equivalent, the torque between coils 16 and 20 will be alternating in direction and of a character known in the physics of sounds as beats. The disturbing effect of these beats can be done away with in several ways. When the movable coils are employed to actuate a telephone diaphragm, the neutralization of the effects of beats is unnecessary, as the beats, which can be controlled by properly proportioning the frequencies, will have such a different frequency as not to interfere with the perception of the sound signals. In the apparatus shown, the inertia of the coils themselves and the relay contacts or sounder fingers, 26, is such that by adjusting the frequencies so that the beat frequency will be high, i. e. more than twenty-five times a second, the movable coils will be incapable of responding to the beat frequencies, but will be responsive to the slower impulses caused by closing the key, 31. For the reasons stated, no indication will be produced by the flow of a portion of the current from the line wire through the movable coil, 20.

When the key, 31, is closed, two currents will flow through the coil, 17, one with the frequency of the synchronizing generator, 2, while the other current will have a different frequency, determined by the commutator, 5, or its described equivalent. Both currents, unless rendered inoperative, would produce an indication. The synchronizing frequency may be eliminated by means of the capacity, 21, and inductance, 22, or the currents in the fixed coil, 13, and movable coil, 17, may be so displaced in phase by means of the inductance, 22, and capacity, 21, or the inductance, 23, or capacity, 30, that no indication will be produced. The effect produced on the coils, 13 and 17, by the current having the frequency determined by the commutator, 5, may be entirely neutralized by changing the phases of the currents. It is preferred, however, not to entirely neutralize this effect, but to so adjust the phases that there will be a certain torque, to permit the operator sending with the key, 31, to hear the signals he is sending. The effects of the two currents on the coils, 13 and 17, may be neutralized if desired by the spring, 27, but as before stated it is preferred to only partially neutralize the effect of the sending impulses.

If, while the operator at 31 is sending, the operator at station B should also send, it is evident that the effect of the impulses sent out on closing key, 33, would be weakened on account of the aforesaid difference in phase, and it is therefore preferred that commutators, 7 and 5, or their described equivalents, should be so adjusted or operated as to give currents of the same frequency, but displaced in phase and preferably at an angle of ninety degrees, so that the impulses sent out from B will when passing through the coil, 17, be in phase with the currents flowing through the fixed coil, 13. That is since the commutator at B generates a voltage displaced 90° from that generated at A, as described, the currents from B are displaced 90° additional, and the currents in coils 17 and 13 will be either together or 180° apart; that is they will be in phase so far as their mutual torque is concerned. If desired, the phase displacement may vary from ninety degrees and may be such that impulses sent out from B will move the coil, 17, in one direction, while the impulses caused by closing key, 31, will cause the coil, 17, to move in the opposite direction. With either of these arrangements or adjustments, the operator at B is able to break the operator at A if he should desire to do so.

With reference to coils 14 and 18, the disturbing effect of impulses sent from B on closing key, 33, is neutralized as described in the case of coils 16 and 20, when key 31 is closed. Effects produced on 14 and 18 by currents from the synchronizing generator, 2, and from the commutator, 5, or its equivalent, when key 31 is closed, are neutralized in any of the ways described in connection with coils 13 and 17. To summarize, the coils, 14, 18 and 16, 20, are not affected when either or both of the keys, 31 and 33, are closed. Coils 15, 19 are affected by closing key, 31. The coils, 13, 17, are either not affected by closing key, 31, or else coil, 17, moves in a direction opposite that produced by closing key, 33, or else moves with a certain desired force.

While I have described a particular embodiment of my invention, I do not limit myself as regards the broad terms of the claims to such specific form, as many changes and modifications within the spirit of my invention will readily suggest themselves to those skilled in the art. Sending and receiving apparatus may be distributed at various points along a line or localized at two stations, as shown. It will be readily understood by those skilled in the art, that resonance effects can be used if desired.

I claim herein as my invention:

1. In signaling apparatus, the combination of a transmitting and a receiving station connected by wire, means for sending periodic impulses over the wire, devices at the sending station for controlling the emission of impulses to make signals, devices at the receiving station for continuously locally generating impulses having a periodicity the same as, and in constant phase relation to, that of the transmitted impulses from the sending station, means to create interacting fields of force by the locally generated and the transmitted impulses respectively and means to produce an indication by said interaction of said fields of force.

2. In signaling apparatus, the combination with a sending and receiving station connected by wire, of means at the sending station for transmitting periodic impulses and devices for controlling the emission of the same to make signals, a local generator at the receiving station for continuously generating impulses of a periodicity similar to and in constant phase relation to, that of, the transmitted impulses, means including two interacting and relatively movable coils generating interacting fields of force, one coil being excited by the transmitted impulses and the other by the locally generated impulses, and means to make a signal operated by said interaction of said fields of force.

3. In signaling apparatus, the combination of a transmitting and a receiving station connected by wire, means for sending periodic impulses over the wire, devices at the sending station for controlling the emission of impulses to make signals, devices at the receiving station for continuously generating local impulses having a periodicity similar to that of the transmitted impulses from the sending station, means to create interacting fields of force by the locally generated and the transmitted impulses respectively and means to produce an indication by said interaction of said fields of force, and means for maintaining the local generator at the receiving station in synchronism with, and in constant phase relation to, the transmitting generator.

4. In signaling apparatus, the combination with a sending and receiving station connected by wire, of a plurality of generators at the sending station adapted for transmitting periodic impulses of different frequencies, means at the receiving station for continuously generating a plurality of sets of impulses of frequencies similar to those transmitted from the sending station, means creating four or more interacting fields of force excited by the transmitted and local impulses of similar frequencies interacting on each other, and indicators operated by the interaction of said pairs of fields of force.

5. In signaling apparatus, the combination with a sending and receiving station connected by wire, of a plurality of generators at the sending station adapted for transmitting periodic impulses of different frequencies, means at the receiving station for continuously generating a plurality of sets of impulses of frequencies similar to those transmitted from the sending station, means creating four or more interacting fields of force excited by the transmitted and local impulses of similar frequencies interacting on each other, and indicators operated by the interaction of said pairs of fields of force, and means for maintaining the pairs of generators of impulses of similar periodicity respectively in synchronism with each other.

In witness whereof, I have hereunto set my hand.

REGINALD A. FESSENDEN.

Witnesses:
 JESSIE E. BENT,
 DOROTHY V. THURMAN.